(12) United States Patent
Anazawa et al.

(10) Patent No.: US 6,902,655 B2
(45) Date of Patent: Jun. 7, 2005

(54) PRODUCING APPARATUS AND PRODUCING METHOD FOR MANUFACTURING CARBON STRUCTURE

(75) Inventors: Kazunori Anazawa, Minamiashigara (JP); Hiroyuki Watanabe, Minamiashigara (JP); Masaaki Shimizu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 487 days.

(21) Appl. No.: 10/080,701

(22) Filed: Feb. 25, 2002

(65) Prior Publication Data

US 2002/0179428 A1 Dec. 5, 2002

(30) Foreign Application Priority Data

Jun. 1, 2001 (JP) ........................................ 2001-167340

(51) Int. Cl.$^7$ ................................................. B01J 19/08
(52) U.S. Cl. ................ 204/176; 423/445 R; 423/445 B
(58) Field of Search ...................... 204/173; 423/445 R, 423/445 B

(56) References Cited

U.S. PATENT DOCUMENTS 5,482,601 A    1/1996  Ohshima et al.

FOREIGN PATENT DOCUMENTS

| EP | 0 665 187 A1 | 8/1995 |
|---|---|---|
| JP | A 58-185767 | 10/1983 |
| JP | A 07-216660 | 8/1995 |
| JP | 08-48510 | 2/1996 |
| JP | A 8-198611 | 8/1996 |
| JP | A 9-309711 | 12/1997 |
| JP | B1 3073986 | 6/2000 |
| JP | A 2002-69756 | 3/2002 |
| JP | A 2002-356316 | 12/2002 |

OTHER PUBLICATIONS

Journet et al., "Large–scale production of single–walled carbon nanotubes by the electric–arc technique", Nature, vol. 388, Aug. 1997, pp. 756–758.

Thess et al., "Crystalline Ropes of Metallic Carbon Nanotubes", Science, vol. 273, Jul. 1996, pp. 486–487.

Kazunori Anazawa et al., "High–purity carbon nanotubes synthesis method by an arc discharging in magnetic field", Applied Physics Letters, Jul. 22, 2002, vol. 81, Num. 4, pp. 739–741.

Yokomichi, Haruo et al. "Effects of High Magnetic Field on the Morphology of Carbon Nanotubes and Selective Synthesis Of Fullerenes." *Applied Physics Letters*, vol. 74, No. 13; Mar. 29, 1999.

*Primary Examiner*—Kishor Mayekar
(74) *Attorney, Agent, or Firm*—Oliff & Berridge, PLC

(57) ABSTRACT

Apparatus for producing a carbon structure at least including two electrodes 11 and 12 having forefront portions opposed to each other, and a power supply 18 for applying a voltage between the electrodes 11 and 12 so that discharge plasma is produced in a discharge area between the electrodes 11 and 12. The apparatus for producing a carbon structure further including a magnetic field generating unit 20 to 23 for forming at least a magnetic field including multidirectional lines of magnetic force or a magnetic field including a component parallel with the traveling direction of a discharge current, in an area where the discharge plasma is generated. In addition, a method for producing a carbon structure, using such an operation.

14 Claims, 7 Drawing Sheets

PRODUCING APPARATUS AND PRODUCING METHOD FOR MANUFACTURING CARBON STRUCTURE

The present disclosure relates to the subject matter contained in Japanese Patent Application No. 2001-167340 filed on Jun. 1, 2001, which is incorporated herein by reference in its entirety.

BACKGROUND OF THE INVENTION

1. Field of the Invention

The present invention relates to a producing apparatus and a producing method for producing a carbon structure such as a carbon nanotube or a fullerene.

2. Description of the Related Art

Fullerenes represented by $C_{60}$ discovered in 1985 and carbon nanotubes discovered in 1991 exhibit unique electron-physical properties different from conventional carbon materials. For this reason, fullerenes and carbon nanotubes attract attention as new carbon allotropes different from graphite, amorphous carbon and diamond.

For example, fullerenes represented by $C_{60}$ and $C_{70}$ have various sorts other than $C_{60}$ and $C_{70}$. In any fullerene, a large number of carbon atoms are disposed in a spherical cage form so as to form one molecule. In addition, since fullerenes are soluble in organic solvents such as benzene, fullerenes are easy to handle. Fullerenes exhibit not only properties as superconductors and semiconductors but also high photo-functional effect. Thus, it is also considered that fullerenes are applied to electro-photographic sensitive materials. Further, by doping the inside of fullerenes with different kinds of elements, or by adding various chemical functional groups to the outside of fullerenes, effective physical properties as functional materials are expressed.

On the other hand, carbon nanotubes are new materials having only carbon as their constituent element similarly to fullerenes. It was discovered that carbon nanotubes had photo-functional effect and functions as semiconductors or the like. Thus, carbon nanotubes are expected to be utilized in any field of the electronics industry. Particularly, since carbon nanotubes can be formed into semiconductors and also into conductors by changing a method of atomic arrangement (chirality) slightly, more expectations are placed on the carbon nanotubes as nanometer-sized low-dimension electrically conductive materials and switching elements. In addition, carbon nanotubes attract attention also as field emission type electron sources and hydrogen storage materials. Further, there are attempts to use carbon nanotubes as probes in tunneling electron microscopes or atomic force microscopes.

In the related art, it has been known that fullerenes and carbon nanotubes can be produced in a resistance heating method, a method based on plasma discharge such as arc discharge using carbon rods as raw material, a laser ablation method, and a chemical vapor deposition (CVD) method using acetylene gas. However, there have been various debates on the details of the mechanism with which fullerenes and carbon nanotubes are produced in the method using arc discharge or laser ablation, and there is no unified interpretation at present.

As for production of fullerenes and carbon nanotubes, various methods aimed at mass synthesis have been researched. The resistance heating method devised in the cradle was a method in which front ends of two pieces of graphite were brought into contact with each other in rare gas, and a current ranging from several tens of A to several hundreds of A was applied thereto so as to heat and evaporate the graphite. However, since it is very difficult to obtain a sample by the gram in this method, the method is hardly used today.

The arc discharge method is a method in which graphite rods are used as a cathode and an anode so that arc discharge is generated in rare gas such as He or Ar to thereby synthesize fullerenes or carbon nanotubes. The temperature in the front end portion of the anode is increased to about 4,000° C. or higher by arc plasma caused by the arc discharge. Thus, the front end portion of the anode is evaporated so that a large amount of carbon radicals are produced. The carbon radicals are deposited on the cathode or the inner wall of an apparatus in the form of soot containing fullerenes or carbon nanotubes. When an Ni compound or an iron compound is included in the anode, the compound acts as a catalyst so that single-wall carbon nanotubes can be produced efficiently.

The laser ablation method is a method in which graphite is irradiated with pulsed laser such as YAG laser so that plasma is generated on the graphite surface to thereby produce fullerenes or carbon nanotubes. This method has a feature in that comparatively high purity fullerenes or carbon nanotubes can be obtained in comparison with those obtained in the arc discharge method.

In the chemical vapor deposition method, acetylene gas or methane gas is used as raw material so that high purity fullerenes or carbon nanotubes can be produced by the chemical decomposition reaction of the raw material gas. Recently, there has been also discovered a method in which carbon nanotubes are produced efficiently by irradiation with a beam of electrons upon a fluorine compound subjected to chemical treatment.

When graphite rods are used as electrodes in the arc discharge method, a large amount of electrons or ions present in arc plasma collide with the anode-side graphite rod. As a result, the temperature of the front end of the graphite rod increases to about 4,000° C. so that a large amount of carbon radicals, carbon ions and neutral particles are released. It is considered that carbon nanotubes are produced in the course where the carbon radicals, the carbon ions and the neutral particles adhere to the cathode or a chamber (the inner wall of the apparatus) or reattach to the anode side. However, since various complicated chemical reactions are produced in the arc plasma by the collision with excited ions or electrons, it is difficult to control the quantity or kinetic energy of carbon ions. Thus, a large amount of amorphous carbon particles and graphite particles are produced simultaneously together with fullerenes or carbon nanotubes so as to form soot in which those particles are mixed.

Therefore, when fullerenes or carbon nanotubes are to be used industrially, it is necessary to refine and separate fullerenes or carbon nanotubes. Particularly, carbon nanotubes are not soluble in any solvent. To refine carbon nanotubes, there have been proposed techniques such as centrifugal separation method, oxidization method, ultrafiltration process, and electrophoresis. However, the physical properties and chemical properties of carbon nanotubes are substantially equivalent to those of amorphous carbon or graphite part icles produced as impurities. Thus, no separation/refinement method has been established for removing these impurities perfectly. In addition, due to many refinement steps carried out, there is a problem that the yield is extremely lowered, or, on the contrary, alkali metal or organic matter is mixed through an surface active agent used as dispersant. To solve such a problem, it is desired that carbon nanotubes whose purity is as high as possible, that is, carbon nanotubes not contaminated with graphite particles or amorphous carbon are synthesized in the stage of synthesizing the carbon nanotubes.

As described previously, graphite is used as an electrode when fullerenes or carbon nanotubes are produced in the arc discharge method. This electrode is evaporated by arc discharge so as to form arc plasma containing $C^+$ and radicals such as C and $C_2$, which become sources of fullerenes or carbon nanotubes. However, the arc plasma containing $C^+$ and radicals such as C and $C_2$ also become sources of graphite particles or amorphous carbon. The details of the conditions under which the arc plasma containing $C^+$ and radicals such as C and $C_2$ are formed into graphite particles or amorphous carbon and into fullerenes or carbon nanotubes when they are deposited on the cathode, still remain unknown.

Description will be made below on the related-art problem of how to increase the purity, particularly the purity of carbon nanotubes which is desired to be high.

As for the synthesis of high purity carbon nanotubes in the arc discharge method, there is an example reported by Journet et. al, in which a single-wall carbon nanotube with purity of about 80% was synthesized (C. Journet et al., Nature Vol. 388, p. 756–758). However, the purity is not sufficient, and it is desired to synthesize higher purity carbon nanotubes.

As for the laser ablation method, there is a report about the synthesis of a high purity single-wall carbon nanotube (A. Thess et al., Nature Vol. 273, p. 483–487). However, only a small amount of carbon nanotubes can be obtained in the laser ablation method. Due to the inefficiency, the cost of carbon nanotubes is increased. In addition, the purity remains about 70% to 90%. This purity cannot be regarded as high enough.

The chemical vapor deposition method depends on chemical reaction occurring in the course of the pyrolysis of methane gas as raw material. It is therefore possible to produce high purity nanotubes. In the chemical vapor deposition method, however, the growth rate of carbon nanotubes is extremely low. Thus, due to the inefficiency, it is difficult to use the chemical vapor deposition method industrially. In addition, the structure of the nanotube produced thus is imperfect with many defects in comparison with a nanotube synthesized in the arc discharge method or the laser ablation method.

SUMMARY OF THE INVENTION

An object of the invention is to therefore solve the foregoing problems in the related-art techniques. Specifically, it is an object of the invention to provide a producing apparatus and a producing method for producing a carbon structure, by which a carbon structure such as a fullerene or a carbon nanotube having high purity and having low concentration of impurities such as amorphous carbon or graphite particles can be synthesized industrially with high efficiency and at low cost.

Generally, when discharge plasma is produced in a magnetic field, charged particles are trapped in the magnetic field by the interaction between the discharge plasma and the magnetic field so that the mean free path of the charged particles is prolonged. Accordingly, the probability that the charged particles collide with one another is improved while the concentration of particles not involved in reaction with neutral particles and the like, comes down.

The present inventors have found that, by applying such a manner to the production of a carbon structure such as a fullerene or a carbon nanotube, a high purity carbon structure having low concentration of impurities such as amorphous carbon or graphite particles could be synthesized industrially with high efficiency and at low cost. Because of this finding, the inventors reach a concept of the invention. That is, the invention provides:

a producing apparatus for producing a carbon structure has two electrodes having forefront portions opposed to each other, a power supply for applying a voltage between the electrodes so that discharge plasma is produced in a discharge area between the electrodes, and a magnetic field generating unit for forming a magnetic field in an area where the discharge plasma is produced; and a producing method for producing a carbon structure, includes the step of applying a voltage between two electrodes having forefront portions opposed to each other, generating discharge plasma in a discharge area between the electrodes, and forming a magnetic field in an area where the discharge plasma is generated.

Incidentally, in the invention, the carbon structure means a structure of carbon having a predetermined molecular structure, exclusive of impurities such as amorphous carbon or graphite particles. Specifically, the carbon structure means a carbon nanotube, a fullerene, and a structure containing a carbon nanotube or a fullerene.

BRIEF DESCRIPTION OF THE DRAWINGS

FIG. 1A is a schematically sectional view. FIG. 1B is a sectional view taken on line A—A in FIG. 1A.

FIG. 2A is a view showing a state where all the permanent magnets 20 to 23 are disposed so that S poles of the permanent magnets 20 to 23 face a discharge area. FIG. 2B is a view showing a state where the permanent magnets adjacent to each other are disposed so that alternately different poles of the adjacent permanent magnets face the discharge area.

FIG. 3A is a perspective view showing a state of the lines of magnetic force formed at a time when a voltage is applied to a coil of an electromagnet. FIG. 3B is a perspective view showing a state of the lines of magnetic force formed at a time when electromagnets are disposed coaxially and apart from each other, and a voltage is applied to a coil of each of electromagnets.

DETAILED DESCRIPTION OF THE PREFERRED EMBODIMENTS

The details of the invention will be described below.

The invention provides a producing apparatus and a producing method for producing a carbon structure, in which a voltage is applied between two electrodes having forefront portions opposed to each other, so that discharge plasma is generated in a discharge area between the electrodes to thereby produce a carbon structure. The producing apparatus and the producing method according to the invention have a feature in that a magnetic field is formed in the discharge area. Here, it is preferable that the magnetic field is a predetermined magnetic field, that is, the magnetic field includes at least multidirectional lines of magnetic force or a component parallel to a traveling direction of a discharge current in the area where the discharge plasma is generated.

The reason is inferred as follows. When discharge plasma is generated in a predetermined magnetic field, the discharge plasma containing $C^+$ and radicals such as C or $C_2$ is trapped in the magnetic field. Accordingly, the probability that charged particles collide with one another in the discharge plasma is improved so that the efficiency in producing the carbon structure can be enhanced. As a result, according to the invention, amorphous carbon or graphite particles formed as impurities can be reduced.

Figure 1A:
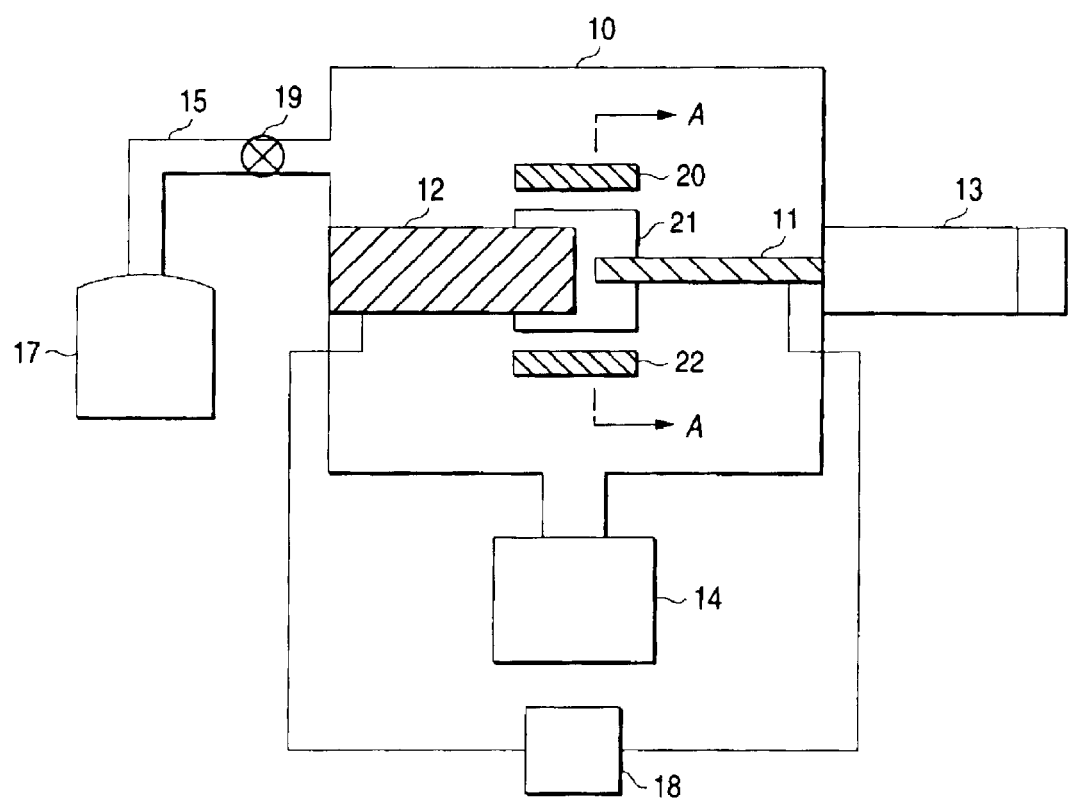
FIGS. 1A and 1B are views showing an embodiment of a producing apparatus for producing a carbon structure according to the invention.
Figure 1B:
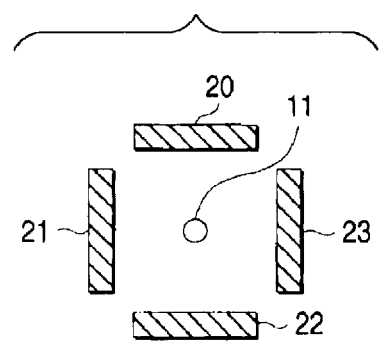

FIG. 1A is a schematically sectional view showing an embodiment of producing apparatus for producing a carbon structure according to the invention, and FIG. 1B is a sectional view taken on line A—A in FIG. 1A. As shown in FIG. 1, the producing apparatus for producing a carbon structure by using discharge plasma has two electrodes (a cathode 11 and an anode 12), a movable unit 13, a power supply 18, an atmosphere adjusting unit constituted by a vacuum pump 14, a gas container 17, a conduit 15 and a valve 19, permanent magnets 20 to 23. The cathode 11 and anode 12 are disposed in a reaction vessel (chamber) 10 which is a closed vessel. The forefront portions of the cathode 11 and the anode 12 are opposed to each other. The movable unit 13 can slide the cathode 11 so that gap between the cathode 11 and the anode 12 can be adjusted. The power supply 18 applies a voltage between the cathode 11 and the anode 12. The vacuum pump 14 can reduce the pressure of the atmosphere in the reaction vessel 10. The gas container 17 stores desired gas. The conduit 15 communicates between the gas container 17 and the reaction vessel 10. The valve 19 can open and shut the communication state of the conduit 15 desirably. The permanent magnets 20 to 23 are disposed to surround the discharge area along a traveling direction of the discharge current. That is, a predetermined magnetic field is formed by the permanent magnets 20 to 23 in the discharge area between the cathode 11 and the anode 12 where discharge plasma is generated when the voltage is applied between the cathode 11 and the anode 12.

Specifically, the predetermined magnetic field formed maybe 1) a magnetic field space surrounded by multidirectional lines of magnetic force so as to be brought into an occluded state, or 2) a magnetic field space in which lines of magnetic force are substantially parallel with the traveling direction of the discharge current so that the motion of charged particles in the discharge plasma is regulated by the lines of magnetic force. When four permanent magnets are used like this embodiment, a magnetic field in the form of the former 1) can be formed.

Figure 2A:
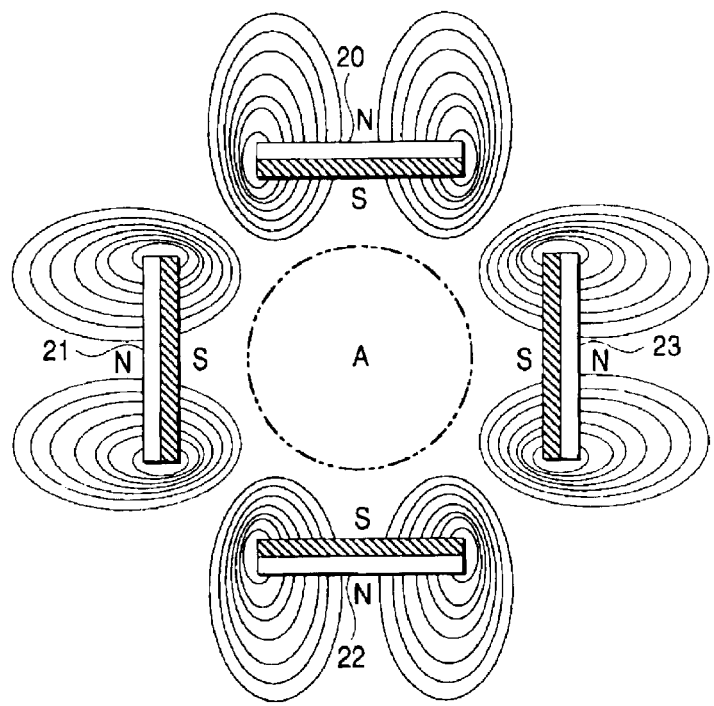
FIGS. 2A and 2B are views showing states of lines of magnetic force in cases where magnetic poles are fixed in permanent magnets shown in FIG. 1B.
Figure 2B:
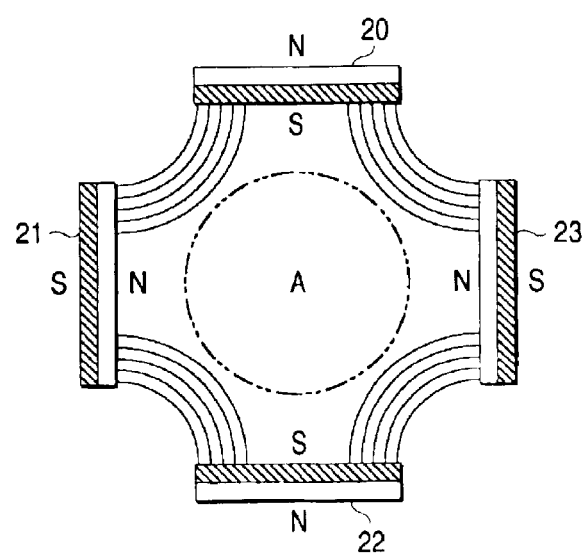

FIGS. 2A and 2B show specific examples of 1) the magnetic field space surrounded by multidirectional lines of magnetic force so as to be brought into an occluded state. FIGS. 2A and 2B are views showing the states of the lines of magnetic force when magnetic poles have been fixed in the permanent magnets 20 to 23 in FIG. 1B. In each of permanent magnets 20 to 23, the black painted portions designates S pole, and the outline portions designate N poles. The lines of magnetic force are illustrated by solid curves. Incidentally, the lines of magnetic force shown in FIGS. 2A and 2B are illustrated not in all of anticipated forms but in only representative forms.

In FIG. 2A, all the permanent magnets 20 to 23 are disposed so that S poles of the permanent magnets 20 to 23 face the discharge area. In this case, the lines of magnetic force radiated from the permanent magnets 20 to 23 toward the discharge area repel one another, respectively. Thus, an area designated by a symbol A is surrounded by multidirectional lines of magnetic force.

In FIG. 2B, the permanent magnets 20 and 22 are disposed so that S poles of the permanent magnets 20 and 22 face the discharge area, and the permanent magnets 21 and 23 are disposed so that N poles of the permanent magnets 21 and 23 face the discharge area. That is, permanent magnets adjacent to each other are disposed so that alternately different poles of the adjacent permanent magnets face the discharge area. In this case, the lines of magnetic force radiated from the permanent magnets 20 to 23 toward the discharge area are converged on permanent magnets adjacent to each other, respectively. Thus, the area designated by the symbol A is surrounded by multidirectional lines of magnetic force.

Thus, according to the forms illustrated in FIGS. 2A and 2B, a multidirectional magnetic field acts on the area designated by the symbol A. Accordingly, when discharge plasma is generated in the area A, it is guessed that the motion of charged particles in the discharge plasma is regulated in the space between the cathode 11 and the anode 12. If a carbon structure is produced in such a manner, a high purity carbon structure having low concentration of impurities can be synthesized industrially with high efficiency and at low cost.

The number of permanent magnets is not always limited to four. A magnetic field having such a form can be formed by a plurality of permanent magnets.

In the former of "the form where all the permanent magnets are disposed so that identical poles of the permanent magnets face the discharge area", for example, three, five, or more planar permanent magnets may be used and disposed to surround the discharge area. When curved permanent magnets are used, two permanent magnets may be disposed so that the concave portions of both the permanent magnets are opposed to each other. In addition, there is no upper limit on the number of permanent magnets. Further, although FIG. 2A illustrates the form where the permanent magnets are disposed so that S poles of the permanent magnets face the discharge area, there is no problem so long as all the poles facing the discharge area are identical. That is, the permanent magnets may be disposed so that N poles of the permanent magnets face the discharge area.

In the latter of "the form where permanent magnets adjacent to each other are disposed so that alternately different poles of the adjacent permanent magnets face the discharge area", it is essential that the number of permanent magnets is even because it is necessary to dispose the permanent magnets adjacent to each other to alternate different poles. In addition, it is necessary to surround the discharge area by the lines of magnetic force. Thus, the number of permanent magnets is essentially at least four, but has no upper limit.

Another example of the form 1) of the predetermined magnetic field may include a form where discharge plasma is generated in an inner hole of a cylindrical permanent magnet.

Although description was made above on the form 1) of the predetermined magnetic field using permanent magnets, magnets used are not limited to permanent magnets. Electromagnets may be used, or both permanent magnets and electromagnets may be used.

Figure 3A:
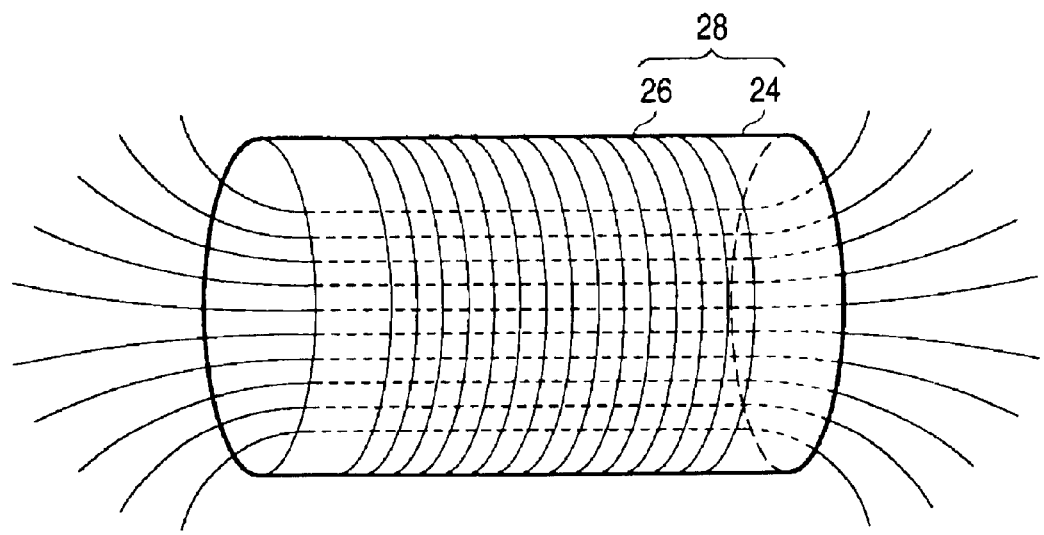
FIGS. 3A and 3B are views showing specific examples of magnetic field spaces where the lines of magnetic force become substantially parallel with a traveling direction of a discharge current so that the motion of charged particles in discharge plasma is regulated by the direction of the lines of magnetic force.
Figure 3B:
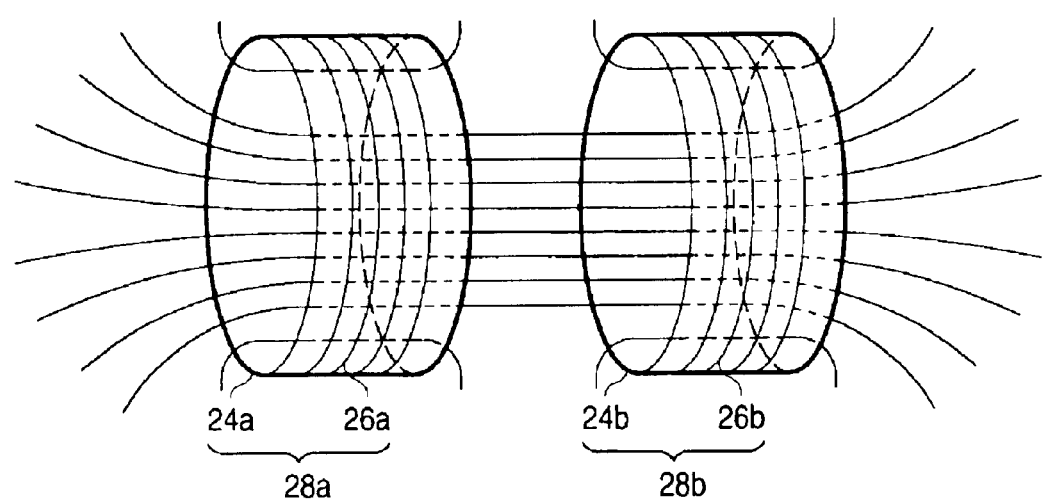

Description will be made on the form 2) of the predetermined magnetic field formed. FIGS. 3A and 3B show specific examples of 2) the magnetic field space where the lines of magnetic force become substantially parallel with the traveling direction of the discharge current so that the motion of charged particles in the discharge plasma is regulated by the lines of magnetic force. FIG. 3A is a perspective view showing the state of the lines of magnetic force formed when a voltage is applied to a coil 26 of an electromagnet 28 obtained by winding the coil 26 around a cylindrical body 24. On the other hand, FIG. 3B is a perspective view showing the state of the lines of magnetic force formed when electromagnets 28*a* and 28*b* obtained likewise are disposed coaxially and apart from each other, and a voltage is applied to coils 26*a* and 26*b* wound around cylindrical bodies 24*a* and 24*b*, respectively. The lines of magnetic force are illustrated by the solid and broken curves. Incidentally, the forms for forming the lines of magnetic force illustrated in FIGS. 3A and 3B are not all of the anticipated forms but only representative forms, and only a part of each of lines of magnetic force are illustrated.

In the form of FIG. 3A, the lines of magnetic force pass through the inside of the cylindrical body 24. That is, the lines of magnetic force become a bundle of substantially parallel lines of magnetic force inside the cylindrical body 24. When discharge plasma is generated inside the cylindrical body 24, and the direction of the lines of magnetic force inside the cylindrical body 24 is substantially coincident with the traveling direction of the discharge current, it is considered that the discharge plasma can be trapped in the magnetic field.

In the form of FIG. 3B, at the same time that the lines of magnetic force pass through the insides of the cylindrical bodies 24*a* and 24*b* respectively, a combined magnetic field is formed in the gap between the cylindrical bodies 24*a* and 24*b*. In the combined magnetic field, the lines of magnetic force passing through the inside of one of the cylindrical bodies 24*a* and 24*b* go straight as they are, and pass through the inside of the other. Thus, though a small part of the lines of magnetic force leak from the space between the cylindrical bodies 24*a* and 24*b*, the lines of magnetic force act as if the cylindrical bodies 24*a* and 24*b* form one coil. That is, there is formed a bundle of substantially parallel lines of magnetic force in the space between the cylindrical bodies 24*a* and 24*b*. When discharge plasma is generated in the space between the cylindrical bodies 24*a* and 24*b*, and the direction of the lines of magnetic force in the space between the cylindrical bodies 24*a* and 24*b* is substantially coincident with the traveling direction of the discharge current, it is considered that the discharge plasma can be trapped in the magnetic field.

The direction of the lines of magnetic force inside the cylindrical body 24 or in the space between the cylindrical bodies 24*a* and 24*b* does not have to be perfectly coincident with the traveling direction of the discharge current. Even in the case where both the directions are not coincident with each other perfectly, it will still go well so long as there is formed a magnetic field in which the discharge plasma can be trapped. However, if the angle between the directions is made too large, there is a possibility that the electrodes are broken due to the relation among the magnetic field, the electric field, and the force. It is therefore preferable that the angle between the directions is set to be in a range of from 0° to 30°. It is more preferable that the angle is set to be in a range of from 0° to 10°.

In addition, even in the case where the traveling direction of the discharge current is not perfectly superimposed on the central axis of the magnetic field, it will still go well so long as the discharge plasma can be trapped in the magnetic field. However, if the discharge plasma is generated too distantly from the central axis of the magnetic field, the straightness of traveling of the discharge plasma may be impaired. It is therefore desired that the axis of the traveling direction of the discharge current comes on a position within 20% of the distance between the central axis of the magnetic field and "the inner surface of the cylindrical body 24" or "the extension of the inner surface of the cylindrical body 24*a* or 24*b*". Incidentally, when the forefront portion of an electrode is formed into a plane, discharge plasma is generated with any point in the plane as a starting point. Thus, the traveling direction of the discharge current is essentially inconstant. However, in the invention, the line connecting the centers of the forefront portions of the two opposed electrodes with each other is regarded as the axis of the traveling direction of the discharge current.

Another example of the form 2) of the predetermined magnetic field may include a form in which a toroidal electromagnet is used, and discharge plasma is generated in an inner hole of the electromagnet.

Examples of kinds of discharge plasma include arc plasma and glow plasma. In order to produce carbon structures such as fullerenes or carbon nanotubes efficiently, it is preferable to set the discharge plasma as arc plasma. In addition, by controlling various conditions such as the pressure of the atmosphere in the closed vessel, fullerenes or carbon nanotubes can be produced selectively. The following description will be made mainly on production of carbon nanotubes by way of example.

Next, description will be made on an example in which a carbon structure is produced by the carbon structure producing apparatus shown in FIGS. 1A and 1B.

The reaction vessel (chamber) 10 is a closed vessel shaped into a cylinder (disposed so that the opposite bottoms of the cylinder come to the right and left in FIG. 1A). It is desired that the material of the reaction vessel 10 is a metal, particularly stainless steel. However, it is preferable that the material is an aluminum alloy or quartz. In addition, the shape is not limited to a cylindrical shape, but it may be a desired shape such as a box-like shape. Further, when a carbon structure is attached to the vicinity of the forefront portion of the cathode 11 while the atmosphere in the discharge area is set to the atmosphere of the air with atmospheric pressure, the reaction vessel 10 is not essential, or the reaction vessel 10 does not have to be a closed vessel.

The cathode 11 and the anode 12 which are two electrodes opposed to each other at their forefront portions are disposed in the reaction vessel 10. At this time, when the material of the reaction vessel 10 is a metal having conductivity, the cathode 11 and the anode 12 are fixed to the reaction vessel 10 while being electrically insulated therefrom. Incidentally, the two electrodes 11 and 12 may be arranged so that the axes of both the electrodes 11 and 12 coincide with each other to be perfectly opposed to each other, as shown in FIG. 1A. Alternatively, the forefront portions of the two electrodes 11 and 12 may be made close to each other with the axes of the electrodes 11 and 12 forming a predetermined angle. The latter case is also contained in the case "the forefront portions are opposed to each other" in the invention. Not to say, the former form shown in FIG. 1A is desirable.

When the electrodes 11 and 12 are arranged so that the opposed surfaces of the cathode 11 and the anode 12 are parallel with each other, stable discharge such as arc discharge can be achieved so that a carbon structure can be synthesized efficiently.

It is desired that the material of the two electrodes 11 and 12 is carbon. However, any material may be preferably used so long as the material contains carbon and its electric resistivity thereof is not lower than 0.01 $\Omega\cdot$cm and not higher than 10 $\Omega\cdot$cm (preferably not lower than 0.01 $\Omega\cdot$cm and not higher than 1 $\Omega\cdot$cm).

The shapes of the two electrodes 11 and 12 are not limited specifically. Examples of the shapes include a cylindrical shape, an angled cylindrical shape, and a truncated conical shape. However, it is desired that the shapes are cylindrical. In addition, the diameter of the forefront portion of each of the two electrodes 11 and 12 (when the forefront portion is not circular, a diameter of a circle having the same area as the sectional area of the forefront portion) is not limited specifically. It is desired that the diameter is not smaller than 1 mm and not larger than 100 mm.

It is desired that, of the two opposed electrodes 11 and 12, the area of the forefront portion of the cathode 11 is not larger than the area of the forefront portion of the anode 12. By making the area of the forefront portion of the cathode 11 not larger than the area of the forefront portion of the anode 12, the purity of a carbon structure obtained is improved further. The ratio between the areas of the both (the area of the forefront portion of the cathode 11 to the area of the forefront portion of the anode 12) is preferably in a range of from 0.1 to 0.9, more preferably in a range of from 0.2 to 0.5.

To stabilize discharge, it is preferable to cool the electrodes 11 and 12 by water to thereby suppress the increase of the electrode temperature. When the electrodes 11 and 12 are intended to be water-cooled, high thermal conductivity metal, particularly copper is desirably used for support portions (not shown) of the electrodes 11 and 12.

The atmosphere in the reaction vessel 10 is adjusted properly by the atmosphere adjusting unit having the vacuum pump 14, the gas container 17, the conduit 15 and the valve 19. Thus, the atmosphere in the discharge area is brought into a desired state. Specifically, the pressure in the reaction vessel 10 can be decreased or increased by the vacuum pump 14. After the pressure in the reaction vessel 10 is decreased by the vacuum pump 14, the valve 19 is opened to introduce desired gas into the reaction vessel 10 through the conduit 15 from the gas container 17 which stores the desired gas. Thus, the atmosphere in the discharge area can be set as the atmosphere of the desired gas. Not to say, when the atmosphere in the discharge area is set as the atmosphere of the air with atmospheric pressure, such an operation of adjusting the atmosphere is not required.

The vacuum pump 14 maybe a rotary pump, a diffusion pump, or a turbo-molecular pump.

It will go well if the pressure of the atmosphere in the reaction vessel 10 (that is, the atmosphere in the discharge area. The same thing will be applied to the following cases.) is not lower than 0.01 Pa and not higher than 510 kPa. However, the atmosphere in the reaction vessel 10 is preferably not lower than 0.1 Pa and not higher than 105 kPa, and more preferably not lower than 13 Pa and not higher than 70 kPa. When the pressure of the atmosphere in the reaction vessel 10 is set thus, a high purity carbon nanotube can be produced. In addition, when pressure lower than the pressure range is selected, a high purity fullerene can be produced.

The atmospheric gas in the reaction vessel 10 is not limited specifically. It is, however, preferable that the atmospheric gas is of the air, helium, argon, xenon, neon, nitrogen, hydrogen, or mixed gas of these gases. When desired gas is introduced, the reaction vessel 10 may be exhausted by the vacuum pump 14 and desired gas is then introduced thereto from the gas container 17 storing the gas so that the inside of the reaction vessel 10 reaches the predetermined pressure.

The invention may allow the atmosphere in the reaction vessel 10 to further include gas made of material containing carbon. In this case, the atmosphere in the reaction vessel 10 may be set to the atmosphere of only the gas made of the carbon-containing material, or the gas made of the carbon-containing material may be introduced into various gas atmospheres described above. When the gas made of the carbon-containing material is included in the atmosphere, it is possible to produce a carbon structure having a peculiar structure as produced in Example 5 which will be described later. In this carbon structure, a structure of carbon has grown around a carbon nanotube, with the carbon nanotube as a central axis.

Though not limited, examples of the available carbon-containing material include a category of hydrocarbon such as ethane, methane, propane, or hexane; a category of alcohol such as ethanol, methanol, or propanol; a category of ketone such as acetone; a category of petroleum; a category of gasoline; and inorganic substances such as carbon monoxide or carbon dioxide. Of them, acetone, ethanol and hexane are preferred.

Any material may be used for the permanent magnets 20 to 23 as the magnetic field generating unit so long as the material can generate magnetic force. Electromagnets may be used in place of the permanent magnets as described previously. The forms shown in FIGS. 2A, 2B, 3A and 3B can be referred to as the predetermined magnetic field formed, as described previously. In the apparatus of FIG. 1, two kinds of magnetic fields in FIGS. 2A and 2B can be selected.

In addition, in the predetermined magnetic field formed, it is preferable that a larger amount of components substantially parallel with the axes of the electrodes 11 and 12 (that is, the traveling direction of the discharge current formed between the electrodes 11 and 12) are included in the lines of magnetic force in the discharge area. Thus, when a carbon nanotube is produced, a high purity carbon nanotube can be obtained. That is, with respect to FIGS. 2A and 2B, the magnetic field shown in FIG. 2A is preferred to the magnetic field shown in FIG. 2B. In this embodiment, the arrangement of FIG. 2A is adopted.

In the producing apparatus for producing a carbon structure in FIG. 1 with the conditions set thus, a voltage is applied between the electrodes 11 and 12 by the power supply 18 so that discharge plasma is generated between the electrodes 11 and 12. When arc discharge is carried out, a contact arc operation may be carried out prior to the arc discharge. The contact arc operation means an operation in which a voltage is applied to the electrodes 11 and 12 brought into contact with each other, and then the electrodes 11 and 12 are set apart from each other by the movable unit 13 to have a predetermined electrode distance so as to generate discharge plasma. By such an operation, stable discharge plasma can be obtained easily and rapidly.

The voltage applied between the electrodes 11 and 12 may be either a DC voltage or an AC voltage. To further improve the purity of a carbon structure obtained, a DC voltage is preferred. Incidentally, when an AC voltage is applied, there is no distinction between an anode and a cathode in the electrodes 11 and 12.

The discharge current density at the time of generating the discharge plasma is preferably not lower than 0.05 A/mm$^2$ and not higher than 15 A/mm$^2$ with respect to the area of the forefront portion of an electrode for generating the discharge plasma, and more preferably not lower than 1 A/mm$^2$ and not higher than 5 A/mm$^2$ likewise. Here, the "electrode for generating the discharge plasma" means a cathode when the applied voltage is a DC voltage, and means an electrode having a smaller area in its forefront portion when the applied voltage is an AC voltage (the same thing will be applied to other provisions in the invention).

The voltage applied between the electrodes 11 and 12 by the power supply 18 is preferably not lower than 1 V and not higher than 30 V, and more preferably not lower than 15 V and not higher than 25 V. As the front end portion of the electrode 12 is consumed by the discharge, the distance between the electrodes 11 and 12 varies during the discharge. It is preferable that such a variation in the distance between the electrodes 11 and 12 is adjusted properly by the movable unit 13 so that the voltage between the electrodes 11 and 12 is controlled to be constant.

The duration of applying the voltage is set to be preferably not shorter than 3 seconds and not longer than 180 seconds, and more preferably not shorter than 5 seconds and not longer than 60 seconds. If the duration is shorter than 3 seconds, the purity of a carbon structure obtained may be degraded because the applied voltage is not stabilized. If the duration is longer than 180 seconds, the magnetic field intensity of the permanent magnets 20 to 23 may be degraded or faded away due to the radiant heat of the discharge plasma. It is therefore not preferable to set the duration to be shorter than 3 seconds or longer than 180 seconds.

It is preferable that the magnetic flux density in the predetermined magnetic field is not lower than 10$^{-5}$ T and not higher than 1 T at the edge of the forefront portion of the electrode of the two opposed electrodes 11 and 12, for generating the discharge plasma. If the magnetic flux density is lower than 10$^{-5}$ T, it is difficult to form an effective magnetic field. If the magnetic flux density is higher than 1 T, it may be difficult that the permanent magnets 20 to 23 for generating a magnetic field are disposed inside the apparatus so as to be close to the area where the discharge plasma is to be generated. It is therefore not preferable to set the magnetic flux density to be lower than 10$^{-5}$ T or higher than 1 T. When the magnetic flux density is made not lower than 10$^{-4}$ T and not higher than 10$^{-2}$ T, stable discharge is generated so that a carbon structure (particularly a carbon nanotube) can be produced efficiently.

When the discharge plasma is generated between the electrodes 11 and 12 in such a manner, carbon leaves the surface of the electrode 11, and reacts to produce a carbon structure such as a fullerene or a carbon nanotube. The produced carbon structure is deposited on the surface or periphery of the forefront portion of the cathode 11, and further on the inner wall of the reaction vessel 10.

Figure 4:
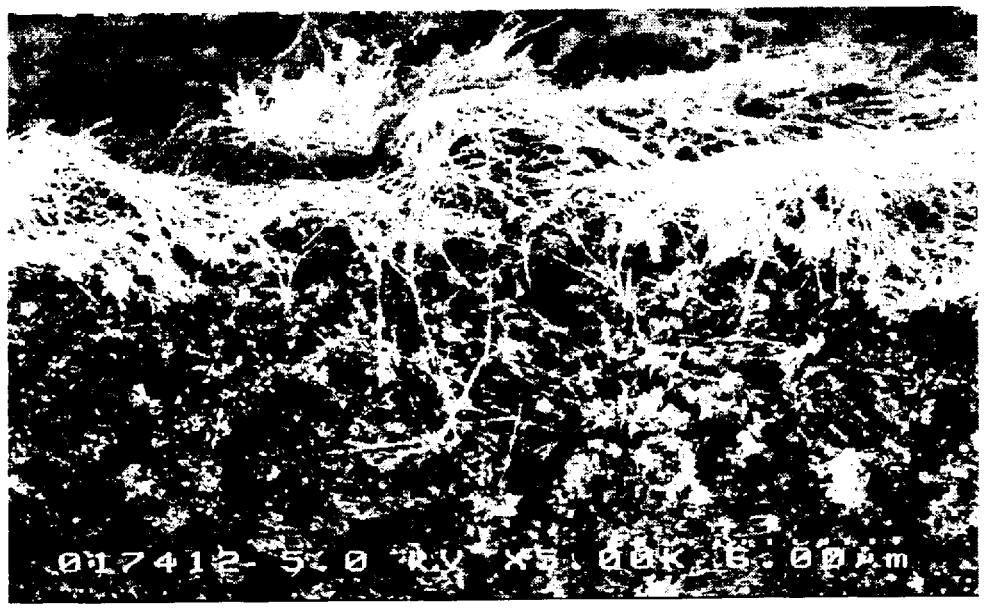
FIG. 4 is a sectional view (magnification ×5,000) of carbon nanotubes deposited on a surface of a forefront portion of a cathode in Example 1, and observed by a scanning electron microscope.

FIG. 4 shows a sectional view of carbon nanotubes deposited on the surface of the forefront portion of the cathode 11, and observed by a scanning electron microscope (magnification ×5,000). This sectional view is obtained by picking up an image of a section of the carbon nanotubes in a surface view (FIG. 5) taken in Example 1 which will be described later. Incidentally, the magnification of the view has a minor error in accordance with the degree of enlargement of the view (hereinafter, the same thing will be applied to the following various views observed by scanning electron microscope). In FIG. 4, the forefront portion (out of the view area) of the cathode 11 is located down below, and deposits including carbon nanotubes are deposited upward. In FIG. 4, the carbon nanotubes look like thin lines.

As is seen in the FIG. 4, carbon nanotubes obtained by the producing apparatus and producing method for producing a carbon structure according to the invention are concentrated near the outermost layer. Blocks seen under the carbon nanotubes near the outermost layer are estimated to be impurities such as amorphous carbon. Therefore, to obtain high purity carbon nanotubes finally and smoothly, the carbon nanotubes near the outermost layer are picked up by rubbing physically.

As described above, according to the invention, an extremely high purity carbon structure can be produced using a discharge plasma method such as arc discharge, which is easy to produce and low in cost. Particularly to obtain a carbon nanotube, the purity thereof can be made not lower than 95% in accordance with the conditions.

EXAMPLES

The invention will be described below more specifically together with its Examples. However, the invention is not limited to these Examples.

Example 1

In Example 1, carbon nanotubes were produced by use of the producing apparatus for producing a carbon structure shown in FIG. 1.

The specific conditions of respective constituents were set as follows.

Reaction Vessel 10: A cylindrical vessel chamber made of stainless steel, with diameter 210 mm, and length 380 mm.

Cathode 11: A cylindrical graphite rod (purity not lower than 99.9%) having an outer diameter of 5 mm.

Anode 12: A cylindrical graphite rod (purity not lower than 99.9%) having an outer diameter of 15 mm.

Moveable Unit 13: The cathode 11 was made movable by a stepping motor. In addition, adjustment was achieved to keep the distance between the electrodes 11 and 12 constant during the plasma discharge.

Power Supply 18: A welding power supply.

Permanent Magnets 20 to 23: Four permanent magnets made of ferrite and having measure of 100 mm by 100 mm by 8 mm thick were disposed as shown in FIG. 2A. The shortest distance between opposed permanent magnets was 108 mm. The magnetic flux density at the edge of the forefront portion of the cathode 11 was 7 mT.

With the producing apparatus, carbon nanotubes were produced. The operation was carried out with the air of 101.325 kPa (1 atmosphere) without reducing the pressure in the reaction vessel 10. To carry out arc discharge between the electrodes 11 and 12, a contact arc operation was performed initially. After discharge started, the electrodes 11 and 12 were separated at a distance of approximately 0.5 mm to 3 mm. The voltage applied from the power supply 18 was set to a DC voltage of 18 V. Under these conditions, arc discharge was carried out for about 1 minute. The value of a current was 40 A, and the discharge current density with respect to the area of the forefront portion of the cathode 11 was 2.0 A/mm$^2$.

After the discharge, the cathode 11 was extracted, and the forefront portion thereof was observed with a scanning electron microscope. A scanning electron microscope S-4500 made by Hitachi Ltd. was used for the scanning electron microscopic observation (the same thing will be applied to other scanning electron microscopic observations). According to the scanning electron microscopic observation, high purity carbon nanotubes were produced in an extremely wide area measuring approximately 3 mm by 3 mm.

Figure 5:
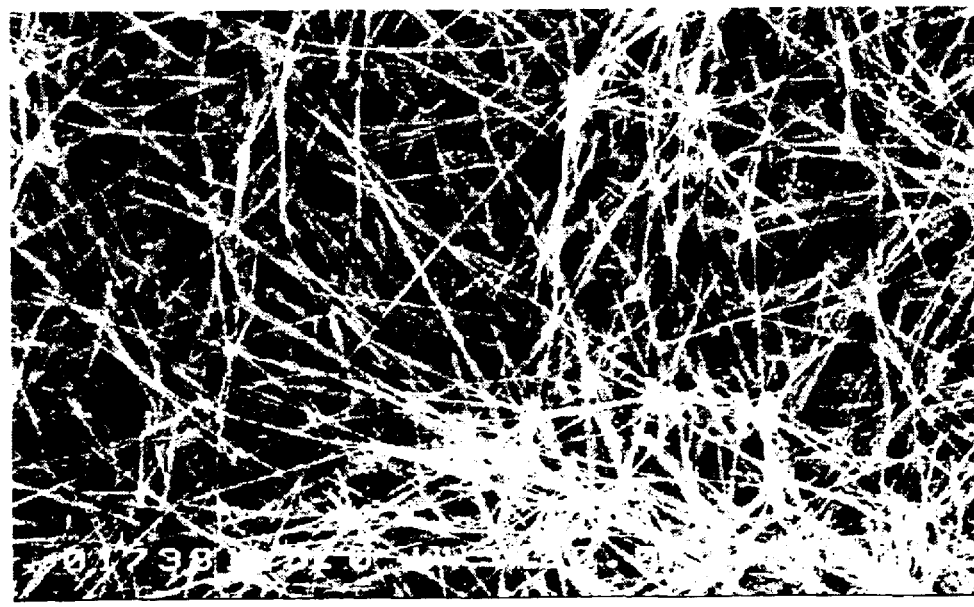
FIG. 5 shows an area where the carbon nanotubes are produced on the surface of the forefront portion of the cathode in the Example 1 (magnification ×20,000).

FIG. 5 shows the area where the carbon nanotubes were produced on the surface of the forefront portion of the cathode 11 (magnification ×20, 000). It is understood from FIG. 5 that the content of impurities is extremely low in the carbon nanotubes produced according to the invention, and the purity of the carbon nanotubes is extremely high. It was proved from FIG. 5 that the purity of the carbon nanotubes estimated was not lower than 99%. Incidentally, a sectional view in this case is shown in FIG. 4 as described previously.

Comparative Example 1

Carbon nanotubes were produced by discharge with apparatus all the same as that in Example 1 and under the same conditions, except that the permanent magnets 20 to 23 were not disposed, and a magnetic field was not formed.

After the discharge, in the same manner as in Example 1, the cathode 11 was extracted and the forefront portion thereof was observed with the scanning electron microscope. According to the observation, carbon nanotubes were formed extremely locally.

Figure 6:
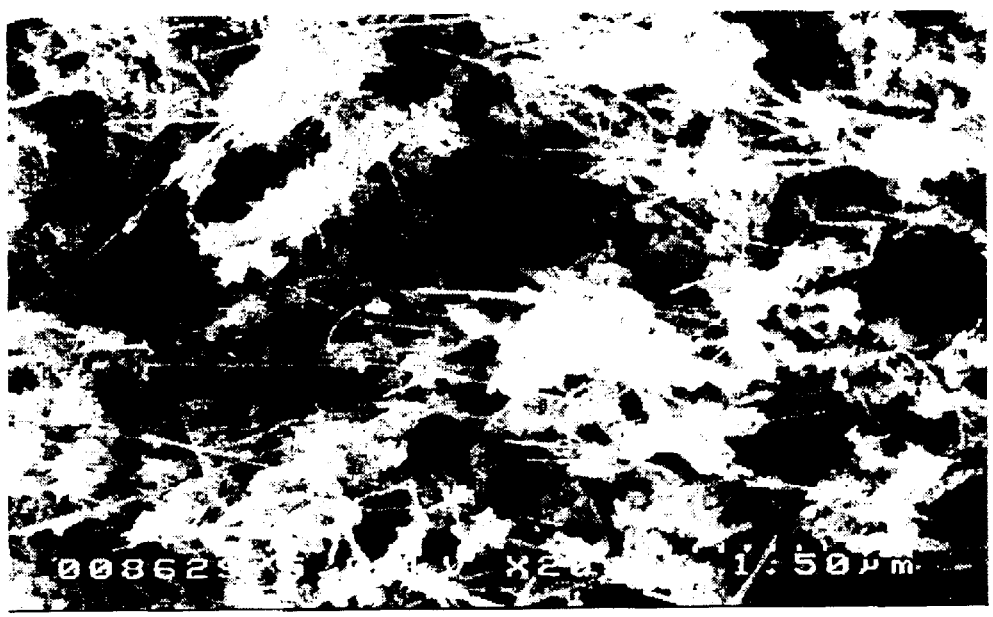
FIG. 6 shows of the area where carbon nanotubes are produced on the surface of a forefront portion of a cathode in Comparative Example 1 (magnification ×20,000).

FIG. 6 shows the local area where the carbon nanotubes were produced on the surface of the forefront portion of the cathode 11 (magnification ×20,000). As is understood from FIG. 6, impurities were deposited together in the area where the carbon nanotubes were produced. Thus, the purity and the yield were drastically inferior to those in Example 1.

Example 2

Carbon nanotubes were produced by discharge with apparatus all the same as that in Example 1 and under the same conditions, except that the permanent magnets 20 to 23 were disposed as shown in FIG. 2B. At this time, the magnetic flux density at the edge of the forefront portion of the cathode 11 was 7 mT.

After the discharge, in the same manner as in Example 1, the cathode 11 was extracted and the forefront portion thereof was observed with the scanning electron microscope. According to the observation, high purity carbon nanotubes were produced in an area about 10 µm square though the area was narrower than that in Example 1.

Figure 7:
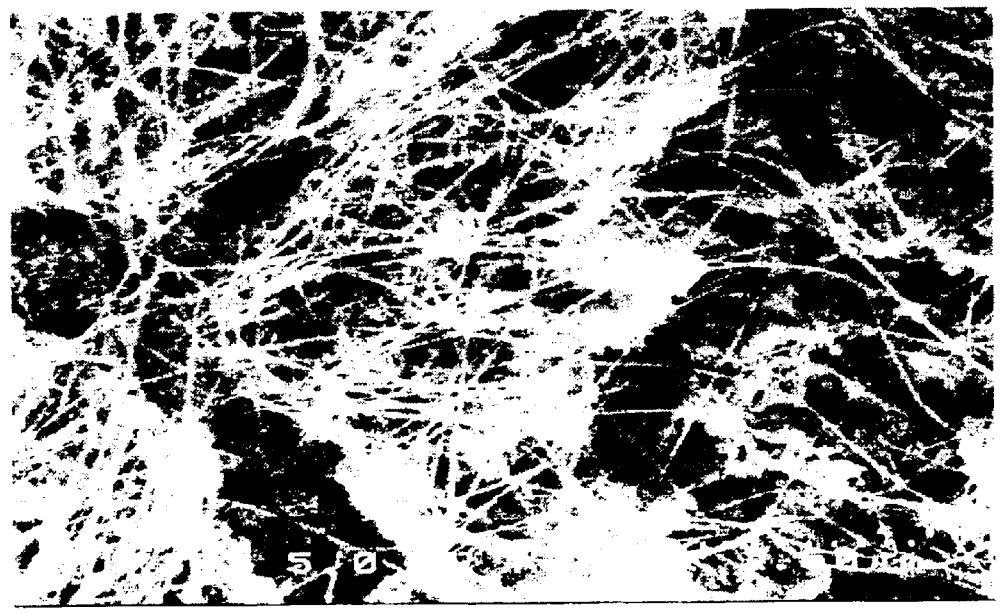
FIG. 7 shows the area where carbon nanotubes are produced on the surface of a forefront portion of a cathode in Example 2 (magnification ×20,000).

FIG. 7 shows the area where the carbon nanotubes were produced on the surface of the forefront portion of the cathode 11 (magnification ×20,000). It is understood from FIG. 7 that the content of impurities is low in the area where the carbon nanotubes are produced, and the carbon nanotubes have high purity.

Example 3

Carbon nanotubes were produced by discharge with apparatus all the same as that in Example 1 and under the same conditions, except that the pressure in the reaction vessel 10 was reduced to 53 kPa by the vacuum pump 14.

After the discharge, in the same manner as in Example 1, the cathode 11 was extracted and the forefront portion thereof was observed with the scanning electron microscope. According to the observation, high purity carbon nanotubes were produced in a wide area about 2 mm square.

Figure 8:
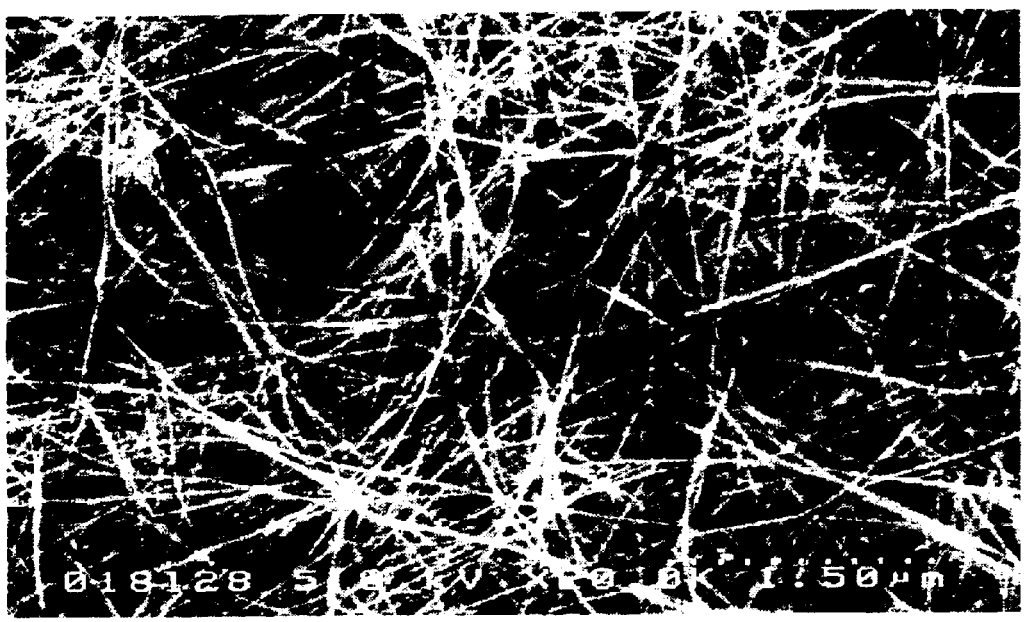
FIG. 8 shows the area where carbon nanotubes are produced on the surface of a forefront portion of a cathode in Example 3 (magnification ×20,000).

FIG. 8 shows the area where the carbon nanotubes were produced on the surface of the forefront portion of the cathode 11 (magnification ×20,000). It is understood from FIG. 8 that the content of impurities is low in the area where the carbon nanotubes are produced, and the carbon nanotubes have high purity.

Example 4

Carbon nanotubes were produced by discharge with apparatus all the same as that in Example 1 and under the same conditions, except that the air inside the reaction vessel 10 was exhausted by the vacuum pump 14 and nitrogen was introduced thereto from the gas container 17 so as to form a nitrogen atmosphere whose pressure was 51 kPa.

After the discharge, in the same manner as in Example 1, the cathode 11 was extracted and the forefront portion thereof was observed with the scanning electron microscope. According to the observation, high purity carbon nanotubes were produced in a wide area about 2 mm square.

Figure 9:
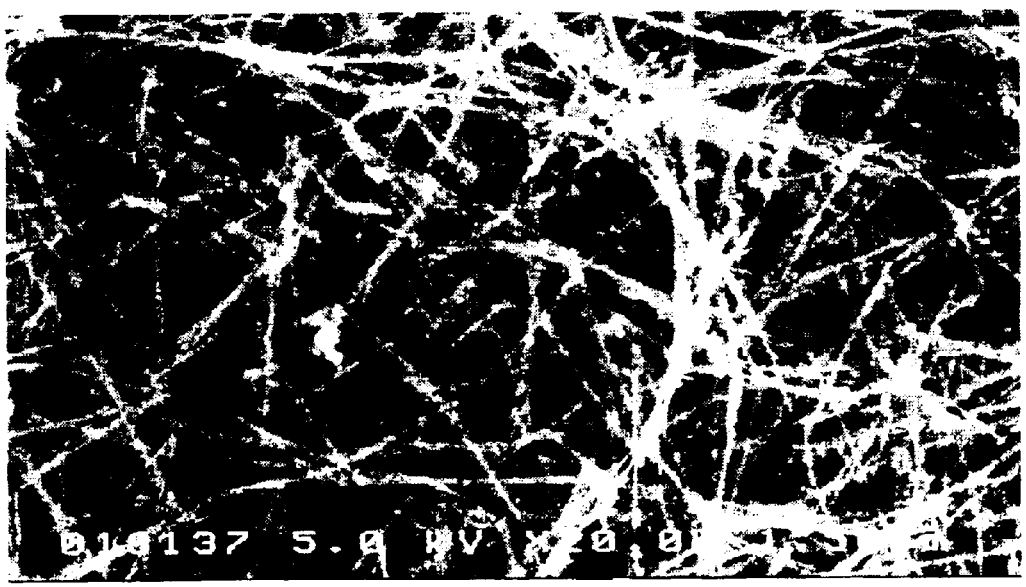
FIG. 9 shows the area where carbon nanotubes are produced on the surface of a forefront portion of a cathode in Example 4 (magnification ×20,000).

FIG. 9 shows the area where the carbon nanotubes were produced on the surface of the forefront portion of the cathode 11 (magnification ×20,000). It is understood from FIG. 9 that the content of impurities is low in the area where the carbon nanotubes are produced, and the carbon nanotubes have high purity.

Example 5

Carbon structures were produced by discharge with apparatus all the same as that in Example 1 and under the same conditions, except that air inside the reaction vessel 10 was exhausted by the vacuum pump 14 and acetone was introduced thereto from the gas container 17 so as to form an acetone atmosphere whose pressure was 40 kPa.

After the discharge, in the same manner as in Example 1, the cathode 11 was extracted and the forefront portion thereof was observed with the scanning electron microscope. According to the observation, high purity carbon structures were produced in an extremely wide area about 3 mm square. In each of the carbon structures, a structure of carbon grew up around a carbon nanotube with the carbon nanotube as the central axis.

Figure 10:
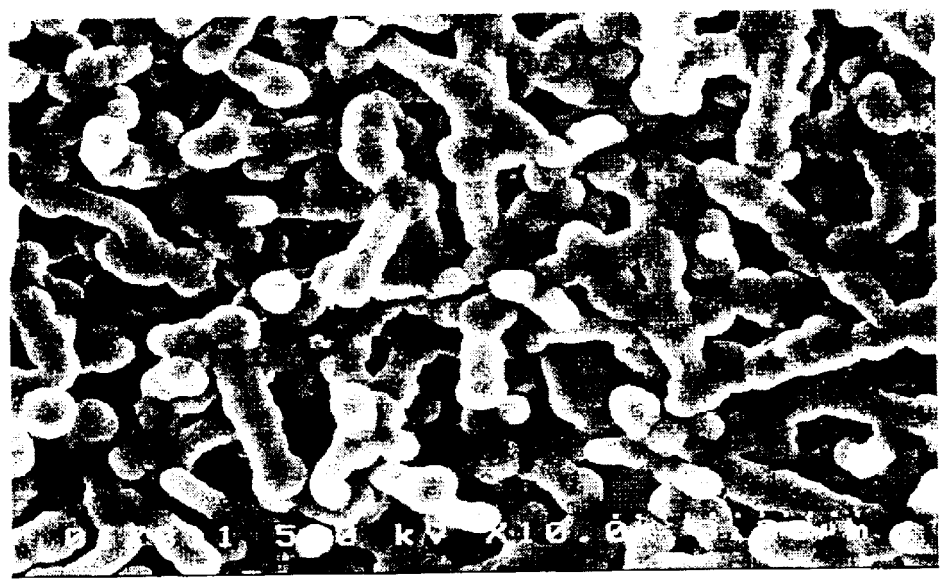
FIG. 10 shows the area where carbon structures are produced on the surface of a forefront portion of a cathode in Example 5 (magnification ×10,000).

FIG. 10 shows the area where the carbon structures were produced on the surface of the forefront portion of the cathode 11 (magnification ×10,000). It is understood from FIG. 10 that the content of impurities is low in the area where the carbon structures are produced, and the carbon structures have high purity.

Example 6

Carbon structures were produced by discharge with apparatus all the same as that in Example 1 and under the same conditions, except that two cylindrical permanent magnets having a form similar to that shown in FIG. 3B were disposed around the electrodes 11 and 12 and coaxially with the electrodes 11 and 12 respectively in place of the permanent magnets 20 to 23, so as to form a magnetic field. At this time, the magnetic flux density at the edge of the forefront portion of the cathode 11 was 18 mT.

After the discharge, in the same manner as in Example 1, the cathode 11 was extracted and the forefront portion thereof was observed with the scanning electron microscope. According to the observation, high purity carbon nanotubes were produced in an area measuring 1.2 mm by 300 μm.

Figure 11:
FIG. 11 shows the area where carbon nanotubes are produced on the surface of a forefront portion of a cathode in Example 6 (magnification ×20,000).

FIG. 11 shows the area where the carbon nanotubes were produced on the surface of the forefront portion of the cathode 11 (magnification ×20,000). It is understood from FIG. 11 that the content of impurities is low in the area where the carbon nanotubes are produced, and the carbon nanotubes have extremely high purity.

As described above, according to the invention, it is possible to provide apparatus and a method for producing a carbon structure, by which a high purity carbon structure such as a fullerene or a carbon nanotube low in concentration of impurities such as amorphous carbon or graphite particles can be synthesized industrially with high efficiency and at low cost.

The apparatus and the method for producing a carbon structure according to the invention have extremely high properties of industrial utilization because they have an extremely great effect in spite of their simple arrangement.

What is claimed is:

1. A producing method for producing a carbon structure, comprising the steps of:
   applying a voltage between two electrodes having forefront portions opposed to each other; and
   generating discharge plasma in a discharge area between the electrodes;
   wherein a magnetic field having multidirectional lines of magnetic force is applied in an area where the discharge plasma is generated to form a magnetic field space so as to be brought into an occluded state by the magnetic field.

2. The method according to claim 1, wherein the discharge plasma generated in the discharge area is arc plasma.

3. The method according to claim 1, wherein one of a plurality of permanent magnets and a plurality of electromagnets are disposed to apply the magnetic field so that the one surround the discharge area along a traveling direction of a discharge current and all identical poles of the one face the discharge area to generate the magnetic field.

4. The method according to claim 1, wherein one of a plurality of permanent magnets and a plurality of electromagnets are disposed to apply the magnetic field so that the one surround the discharge area along a traveling direction of a discharge current and alternately different poles of adjacent ones of the one face the discharge area to generate the magnetic field.

5. The method according to claim 1, wherein one coil having a central axis, which is substantially coincide with a traveling direction of a discharge current to generate the magnetic field.

6. The method according to claim 1, wherein in the discharge plasma generating step, magnetic flux density at an edge of a forefront portion of an electrode of the two opposed electrodes for generating the discharge plasma is not lower than $10^-$ T and not higher than 1 T.

7. The method according to claim 1, wherein in the discharge plasma generating step, discharge current density at the time of generating the discharge plasma is not lower than 0.05 A/mm$^2$ and nor higher than 15 A/mm$^2$ with respect to an area of a forefront portion of an electrode for generating the discharge plasma.

8. The method according to claim 1, wherein in the voltage applying step, the voltage applied to the electrodes is not lower than 1 V and not higher than 30 V.

9. The method according to claim 1, wherein in the voltage applying step, the voltage applied to the electrodes is a DC voltage.

10. The method according to claim 9, wherein an area of a forefront portion of a cathode of the two opposed electrodes is not larger than an area of a forefront portion of an anode thereof.

11. The method according to claim 1,
    wherein material of the electrodes is one of carbon and material which contains carbon; and
    electric resistivity of the material is not lower than 0.01 Ω·cm and nor higher than 10 Ω·cm.

12. The method according to claim 1, wherein pressure of an atmosphere in the discharge area is not lower than 0.01 Pa and not higher than 510 kPa.

13. The method according to claim 1, wherein an atmosphere in the discharge area is a gas atmosphere containing at least one gas selected from the group of air, helium, argon, xenon, neon, nitrogen and hydrogen.

14. The method according to claim 1, wherein gas made of material containing carbon is included in an atmosphere in the discharge area.

* * * * *